(12) United States Patent
Fujimoto

(10) Patent No.: US 9,780,619 B2
(45) Date of Patent: Oct. 3, 2017

(54) ELECTRIC DRIVE DEVICE AND ELECTRIC POWER STEERING DEVICE

(71) Applicant: HITACHI AUTOMOTIVE SYSTEMS, LTD., Hitachinaka-shi, Ibaraki (JP)

(72) Inventor: Masao Fujimoto, Isesaki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 30 days.

(21) Appl. No.: 14/842,061

(22) Filed: Sep. 1, 2015

(65) Prior Publication Data

US 2016/0065030 A1    Mar. 3, 2016

(30) Foreign Application Priority Data

Sep. 3, 2014    (JP) .................................. 2014-178802

(51) Int. Cl.
| | |
|---|---|
| *B62D 5/04* | (2006.01) |
| *H02K 5/22* | (2006.01) |
| *H02K 9/22* | (2006.01) |
| *H02K 11/00* | (2016.01) |

(52) U.S. Cl.
CPC .............. *H02K 5/22* (2013.01); *B62D 5/046* (2013.01); *B62D 5/0409* (2013.01); *H02K 9/22* (2013.01); *H02K 11/0073* (2013.01)

(58) Field of Classification Search
CPC .......... H02K 5/22; H02K 9/22; B62D 5/0409; B62D 5/0412; B62D 5/046; B62D 5/0406
USPC ....................................................... 180/444
See application file for complete search history.

(56) References Cited

U.S. PATENT DOCUMENTS

| | | | | |
|---|---|---|---|---|
| 6,577,030 B2 * | 6/2003 | Tominaga | ............ | B62D 5/0406 310/64 |
| 7,621,367 B2 * | 11/2009 | Tominaga | ............ | B62D 5/0406 180/444 |
| 8,520,394 B2 * | 8/2013 | Wakita | ................. | B62D 5/0406 165/104.33 |
| 8,957,556 B2 * | 2/2015 | Yamasaki | ............... | H02K 5/225 310/68 D |
| 9,455,610 B2 * | 9/2016 | Tomizawa | ............. | H02K 29/08 |

(Continued)

FOREIGN PATENT DOCUMENTS

JP    2013-060119 A    4/2013

*Primary Examiner* — Anne Marie Boehler
*Assistant Examiner* — Michael Stabley
(74) *Attorney, Agent, or Firm* — FOLEY & LARDNER LLP

(57) ABSTRACT

In construction of an electric drive device such as an electric power steering device or the like, there is employed a cylindrical metal housing that has therein in order first, second, third and fourth spaces coaxially arranged to respectively house therein a power circuit part, a power conversion circuit part, a control circuit part and an electric motor, a circular heat transfer metal substrate is arranged in the cylindrical metal housing between the first and second spaces and the circular heat transfer metal substrate has a cylindrical outer wall that is in contact with a cylindrical inner surface of the cylindrical metal housing, one flat surface to which a basal metal plate of the power circuit part is intimately connected and another flat surface to which a basal metal plate of the power conversion circuit part is intimately connected.

15 Claims, 8 Drawing Sheets

(56) References Cited

U.S. PATENT DOCUMENTS

| | | | | |
|---|---|---|---|---|
| 2005/0167183 A1* | 8/2005 | Tominaga | ............ | B62D 5/0406 180/444 |
| 2011/0285223 A1* | 11/2011 | Miyachi | ................. | H02K 11/33 310/64 |
| 2012/0098365 A1* | 4/2012 | Yamasaki | ............ | B62D 5/0406 310/71 |
| 2012/0104886 A1* | 5/2012 | Yamasaki | ............ | B62D 5/0406 310/71 |
| 2012/0161590 A1* | 6/2012 | Yamasaki | .............. | H02K 5/225 310/68 B |
| 2013/0249335 A1* | 9/2013 | Motoda | ................ | B62D 5/0406 310/71 |
| 2013/0257192 A1* | 10/2013 | Tsuboi | .................... | H02K 9/22 310/52 |
| 2015/0042215 A1* | 2/2015 | Murakami | ............... | H02K 5/00 310/68 R |

* cited by examiner

ELECTRIC DRIVE DEVICE AND ELECTRIC POWER STEERING DEVICE

BACKGROUND OF THE INVENTION

1. Field of the Invention:

The present invention relates in general to an electric drive device and more particularly to an electric power steering device. More specifically, the present invention is concerned with an electric power steering device of a type that has an electronic control device installed therein.

2. Description of the Related Art:

In the field of industrial machines of these days, elements for controlling the machines are driven by an electric motor. Recently, a so-called mechanically and electrically integrated type drive device has started to be put into a practical usage in the field of the industrial machines, in which an electronic control device including semiconductor elements for controlling rotation speed and torque of an electric motor is integrally installed in the electric motor.

One of such mechanically and electrically integrated type drive devices is an electric power steering device used in a motor vehicle. When, in the electric power steering device, a steering wheel is handled by a driver, rotation direction and rotation torque of a steering shaft to which the steering wheel is connected are detected, and based on the detected rotation direction and rotation torque, an electric motor is turned in such a direction as to assist the driver's steering work. That is, a steering assist torque is produced by the electric motor upon turning of the steering wheel by the driver. For controlling the electric motor in the above-mentioned manner, an electronic control unit (ECU) is employed, which is installed in the electric power steering device.

Japanese Laid-open Patent Application (tokkai) 2013-60119 shows such electric power steering device. That is, the electric power steering device disclosed by the publication has an electric motor and an electronic control unit that are installed in a main body of the electric power steering device.

More specifically, the electric motor used for the electric power steering device has a cylindrical motor housing of aluminum alloy for receiving therein essential parts of the electric motor, and the electronic control unit used therefor is received in an ECU housing that is arranged at an axial end of the cylindrical motor housing opposite to the other axial end where an output shaft of the electric motor is provided. The electronic control unit in the ECU housing generally comprises a power circuit part, a power conversion circuit part that includes MOSFET (viz., metal oxide silicon field effect transistor) for controlling driving of the electric motor and a control circuit part that controls the MOSFET. Output terminals of the MOSFET are connected to input terminals of the electric motor through bus bars.

To the electronic control unit in the ECU housing, there is fed an electric power from a power source through a connector terminal assembly that is made of a synthetic resin and has lead wires installed therein. Information signals from detecting sensors are fed to the electronic control unit to detect current operation condition of the electric power steering device. When assembling the electric power steering device, the connector terminal assembly is passed through an opening of the ECU housing and connected to the electronic control unit, and then fixed to an outer wall of the ECU housing through connecting bolts.

In addition to the above-mentioned electric power steering device, the mechanically and electrically integrated type drive device is applied to electric hydraulic pressure control devices such as electric brake and the like.

SUMMARY OF THE INVENTION

The electric power steering device described in the above-mentioned Japanese Laid-open Patent Application (tokkai) 2013-60119 is arranged in an engine room of a motor vehicle. Thus, downsizing of the electric power steering device is strongly desired because in these days various auxiliary devices such as exhaust emission control device, safety measure device and the like are arranged in the engine room.

Furthermore, in the electric power steering device of the above-mentioned Japanese publication, the power circuit part, the power conversion circuit part and the control circuit part are mounted on two substrates. However, due to increased number of elements that constitute the power circuit part, the power conversion circuit part and the control circuit part, the size of the housing for installing therein the electronic control unit is inevitably increased particularly in a radial direction. Furthermore, since the power circuit part and the power conversion circuit part are those that generate heat, it has been strongly desired to effectively radiate the heat of the circuit parts to the open air.

It is therefore an object of the present invention to provide an electric drive device and an electric power steering device which are free of the above-mentioned drawbacks.

In accordance with the present invention, there is provided an electric drive device and an electric power steering device in which a metal housing for installing therein an electronic control unit is suppressed from increasing its radial size and a heat generated by the electronic control unit is effectively transferred to the metal housing through a heat transfer metal substrate installed in the metal housing.

In the present invention, electric elements that constitute the electronic control unit are divided by function into three groups that are coaxially arranged in a cylindrical metal housing thereby to suppress the cylindrical metal housing from having an increased radial size. Furthermore, respective basal metal plates of two circuit parts are intimately connected to opposed flat surfaces of a circular heat transfer metal substrate whose cylindrical outer wall is intimately connected to a cylindrical inner surface of the cylindrical metal housing, so that heat produced by the two circuit parts is effectively transferred through the heat transfer metal substrate to the cylindrical metal housing and then effectively radiated from the cylindrical metal housing to the open air.

In accordance with a first aspect of the present invention, there is provided an electric drive device for driving a machine system, which comprises an electric motor having an output shaft by which control elements of the machine system are driven; and an electronic control unit arranged at a position opposite to the position where the output shaft of the electric motor is arranged, the electronic control unit including a cylindrical metal housing with a bottom wall that has the electric motor connected thereto and an electronic control assembly that is installed in the cylindrical metal housing to control the operation of the electric motor, wherein the electronic control assembly is divided into three parts that are coaxially installed in the cylindrical housing in order, the three parts being a power circuit part that is mounted on a basal metal plate and mainly generates an electric power, a power conversion circuit part that is mounted on a basal metal plate and mainly drives the electric motor and a control circuit part that is mounted on a resin plate and mainly controls the power conversion circuit part, wherein a heat transfer metal substrate is installed in the cylindrical metal housing while contacting at a cylindrical outer wall thereof with an inner wall of the cylindrical metal housing; and wherein the basal metal plate of the power circuit part and the basal metal plate of the power conversion circuit part are intimately and respectively connected to opposed flat surfaces of the heat transfer metal substrate.

In accordance with a second aspect of the present invention, there is provided an electric power steering device of a motor vehicle, which comprises an electric motor having an output shaft through which a steering assist force is applied to a steering shaft of the vehicle; an electronic control device for controlling the electric motor, the electronic control device being arranged at a position opposite to the position where the output shaft of the electric motor extends and including a cylindrical housing that has a bottom to which the electric motor is connected and an electronic control assembly that is installed in the cylindrical housing to control the operation of the electric motor, wherein the electronic control assembly is divided into three parts that are coaxially installed in the cylindrical housing in order, the three parts being a power circuit part that is mounted on a basal metal plate and mainly generates an electric power, a power conversion circuit part that is mounted on a basal metal plate and mainly drives the electric motor and a control circuit part that is mounted on a resin plate and mainly controls the power conversion circuit part, wherein a heat transfer metal substrate is installed in the cylindrical metal housing while contacting at a cylindrical outer wall thereof with an inner wall of the cylindrical metal housing; and wherein the basal metal plate of the power circuit part and the basal metal plate of the power conversion circuit part are intimately and respectively connected to opposed flat surfaces of the heat transfer metal substrate.

In accordance with a third aspect of the present invention, there is provided an electric power steering device of a motor vehicle, which comprises a cylindrical metal housing having therein first, second, third and fourth spaces that are coaxially arranged in order; an electric motor mounted in the fourth space and having an output shaft through which a steering assist force is applied to a steering shaft of the motor vehicle; a power circuit part arranged in the first space and including a first basal metal plate and electric elements mounted on the first basal metal plate; a power conversion circuit part arranged in the second space and including a second basal metal plate and electric elements mounted on the second basal metal plate; a control circuit part arranged in the third space and including electric elements; a circular heat transfer metal substrate arranged in the cylindrical metal housing between the first and second spaces, the circular heat transfer metal substrate having a cylindrical outer wall that is in contact with an inner cylindrical surface of the cylindrical metal housing, an upper flat surface to which the first basal metal plate is intimately connected and a lower flat surface to which the second basal metal plate is intimately connected; and a lid member connected to an open end of the cylindrical metal housing.

BRIEF DESCRIPTION OF THE DRAWINGS

Other objects and advantages of the present invention will become apparent from the following description when taken in conjunction with the accompanying drawings, in which.

DESCRIPTION OF KNOWN ELECTRIC POWER STEERING DEVICE

Figure 1:
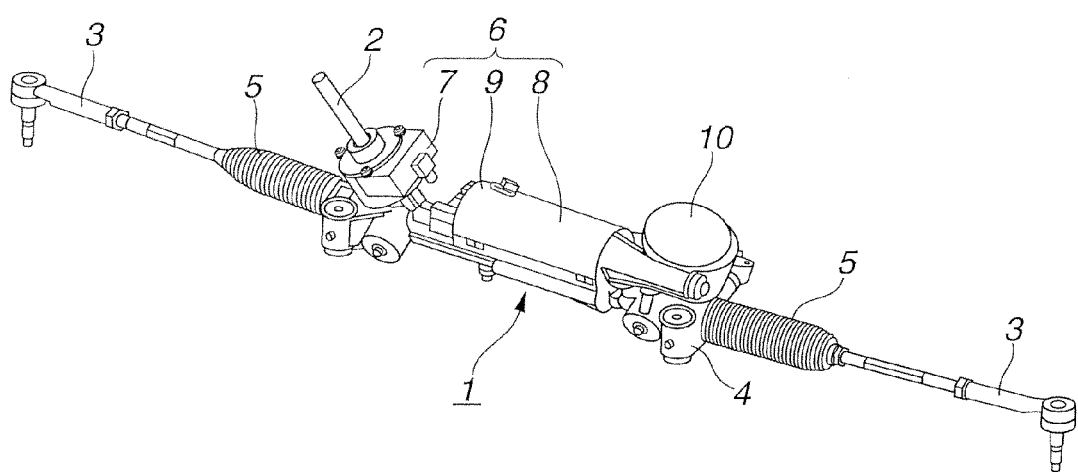
FIG. 1 is a perspective view of a known electric power steering device whose essential portion is of a so-called mechanically and electrically integrated type.
Figure 2:
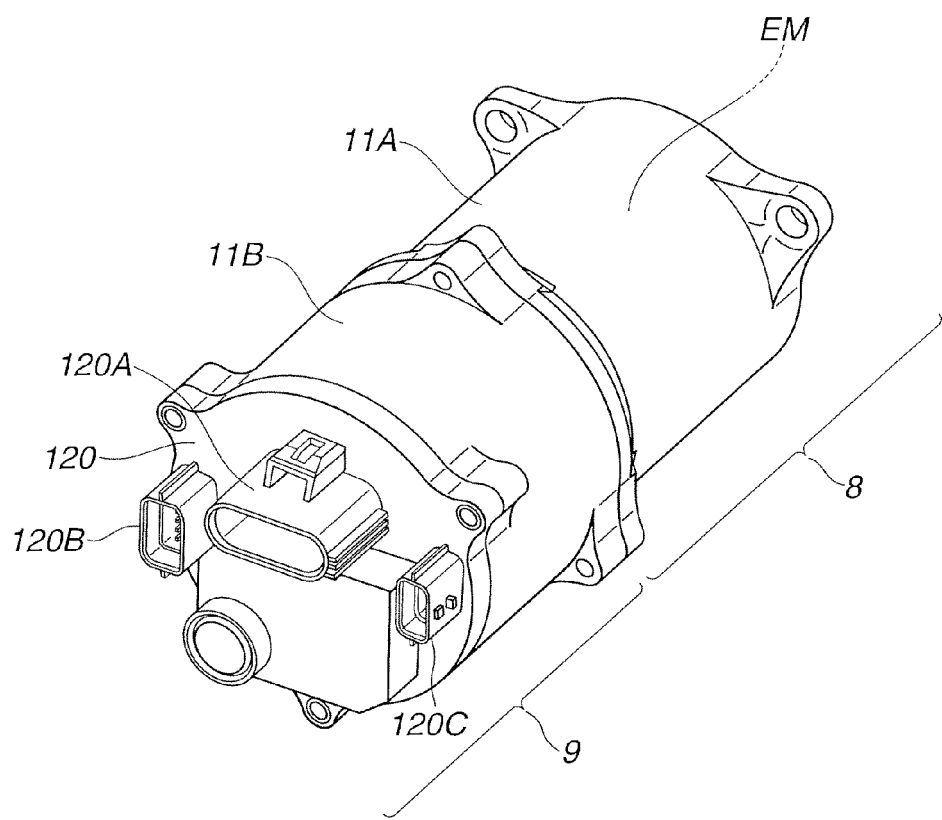
FIG. 2 is an enlarged perspective view of the essential portion of the known electric power steering device of FIG. 1, which is of the mechanically and electrically integrated type.

Prior to starting a detailed description on the present invention, one known electric power steering device whose essential portion is of a mechanically and electrically integrated type will be briefly described with the aid of FIGS. 1 and 2 for the purpose of clarifying unique features of the electric power steering device possessed by the present invention.

Referring to FIG. 1, there is shown an entire construction of a known electric power steering device 1 whose essential portion is of the mechanically and electrically integrated type. The electric power steering device 1 shown is constructed and designed to steer front wheels of a motor vehicle.

In FIG. 1, designated by numeral 2 is a steering shaft to which a steering wheel (not shown) is connected. The steering shaft 2 has at its lower end a pinion (not shown) operatively meshed with a rack (not shown) that is movable in a lateral direction of the motor vehicle. The rack has at its both ends respective tie-rods 3, and the rack is covered by a rack housing 4. Between the rack housing 4 and each tie-rod 3, there extends a rubber boot 5.

Designated by numeral 6 is an electric power assist unit that is constructed to assist the driver's steering work. The electric power assist unit 6 generally comprises a rotation/torque sensor 7 that detects both a rotation direction and a rotation torque of the steering shaft 2, an electric motor part 8 that has an electric motor to assist the lateral movement of the rack through a gear unit 10 and an electronic control unit (ECU) 9 that controls the electric motor based on the information detected by the rotation/torque sensor 7.

As will be understood from FIG. 1, an output shaft (not shown) of the electric motor of the electric motor part 8 extends toward the gear unit 10 and is engaged with the gear unit 10, and the electronic control unit 9 is arranged at a position that is axially opposite to the position where the gear unit 10 is provided.

As is seen from FIG. 2, the electric motor part 8 has a cylindrical motor housing 11A of aluminum alloy in which the electric motor "EM" is installed.

It is to be noted that also in FIG. 2, the electronic control unit 9 including an ECU housing 11B of aluminum alloy is arranged at one axial end of the electric motor part 8 that is axially opposite to the position where the output shaft (not shown) of the electric motor "EM" is provided.

The motor housing 11A and ECU housing 11B are mated at their mutually facing ends and integrally connected to one another through connecting bolts (not shown). The electronic controller assembly installed in the ECU housing 11B comprises a power circuit part that produces an electric power, a power conversion circuit part that includes MOSFET for controlling driving of the electric motor of the electric motor part 8 and a control circuit part that controls the MOSFET. Output terminals of the MOSFET and input terminals of the electric motor are electrically connected through bus bars (not shown).

As is seen from FIG. 2, to the other end of the ECU housing 11B, there is fixed a lid member 120 of synthetic resin through connecting bolts (not shown). The lid member 120 constitutes part of a connector terminal assembly. The lid member 120 is provided with a power input connector terminal part 120A, an information signal input connector terminal part 120B and an instruction signal output connector terminal part 120C. In operation, the electronic controller assembly installed in the ECU housing 11B is fed with an electric power from the power source through the power input connector terminal part 120A of the lid member 120, and at the same time, information signals issued from various detecting sensors are led to the electronic controller assembly through the information signal input connector terminal part 12B, and instruction signals issued from the electronic controller assembly are led to various controlled parts through the instruction signal output connector terminal part 120C.

Referring back to FIG. 1, when, in operation, the steering wheel (not shown) is turned or handled by a driver, the rotation direction and rotation torque of the steering shaft 2 are detected by the rotation/torque sensor 7. Upon this, the detected values of the rotation direction and rotation torque are processed by the electronic control unit 9 to calculate a desired driving operation amount that is to be done by the electric motor. Based on the desired driving operation amount of the electric motor thus calculated, the electric motor is operated by the MOSFET of the power conversion circuit part, so that the output shaft of the electric motor is turned in the same direction as the steering shaft 2 for a given time. With this, the manual steering work by the driver is assisted by the electric power assist unit 6.

However, even in the above-mentioned known electric power steering device 1, downsizing of the same has failed to obtain a satisfied result due to its inherent construction. That is, in the above-mentioned known steering device 1, the radial size of the electric power assist unit 6 has not been sufficiently reduced by a known measure. Furthermore, the electric power assist unit 6 of the power steering device 1 has not taken a satisfied measure for effectively transferring the heat of the power circuit and power conversion circuit parts to the open air.

DETAILED DESCRIPTION OF THE INVENTION

In the following, an electric power steering device according to the present invention, which is free of the above-mentioned drawbacks, will be described in detail with reference to FIGS. 3 to 8.

For ease of understanding, substantially same parts as those of the above-mentioned known electric power assist unit 6 are denoted by the same numerals in FIGS. 3 to 8. Furthermore, in the following description, for ease of understanding, various directional terms, such as, right, left, upper, lower, rightward and the like are used. However, such terms are to be understood with respect to only a drawing or drawings on which corresponding part or portion is shown.

Figure 3:
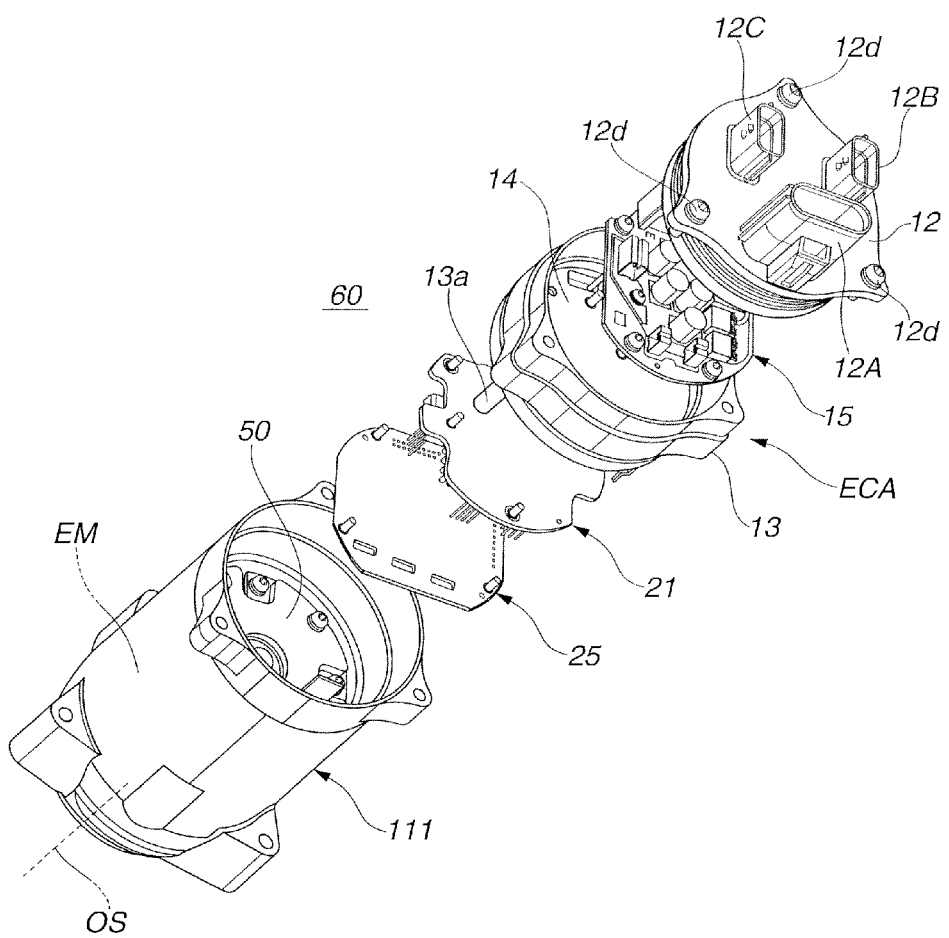
FIG. 3 is an exploded perspective view of an essential portion of an electric power steering device according to the present invention.

Referring to FIG. 3, there is shown an electric power assist unit 60 of a mechanically and electrically integrated type, which is employed in the electric power steering device of the present invention.

As is seen from FIG. 3, the electric power assist unit 60 comprises an electric motor "EM" that is installed in a lower part of a cylindrical motor housing 111 made of aluminum alloy. As is understood from FIG. 3, the electric motor "EM" in the cylindrical motor housing 111 is so postured that its output shaft "OS" extends diagonally in the lower-left direction in the drawing.

As will become apparent as the description proceeds, the cylindrical motor housing 111 is of a monoblock type and constructed and sized to contain therein not only the electric motor "EM" but also an electronic controller assembly "ECA".

Figure 4:
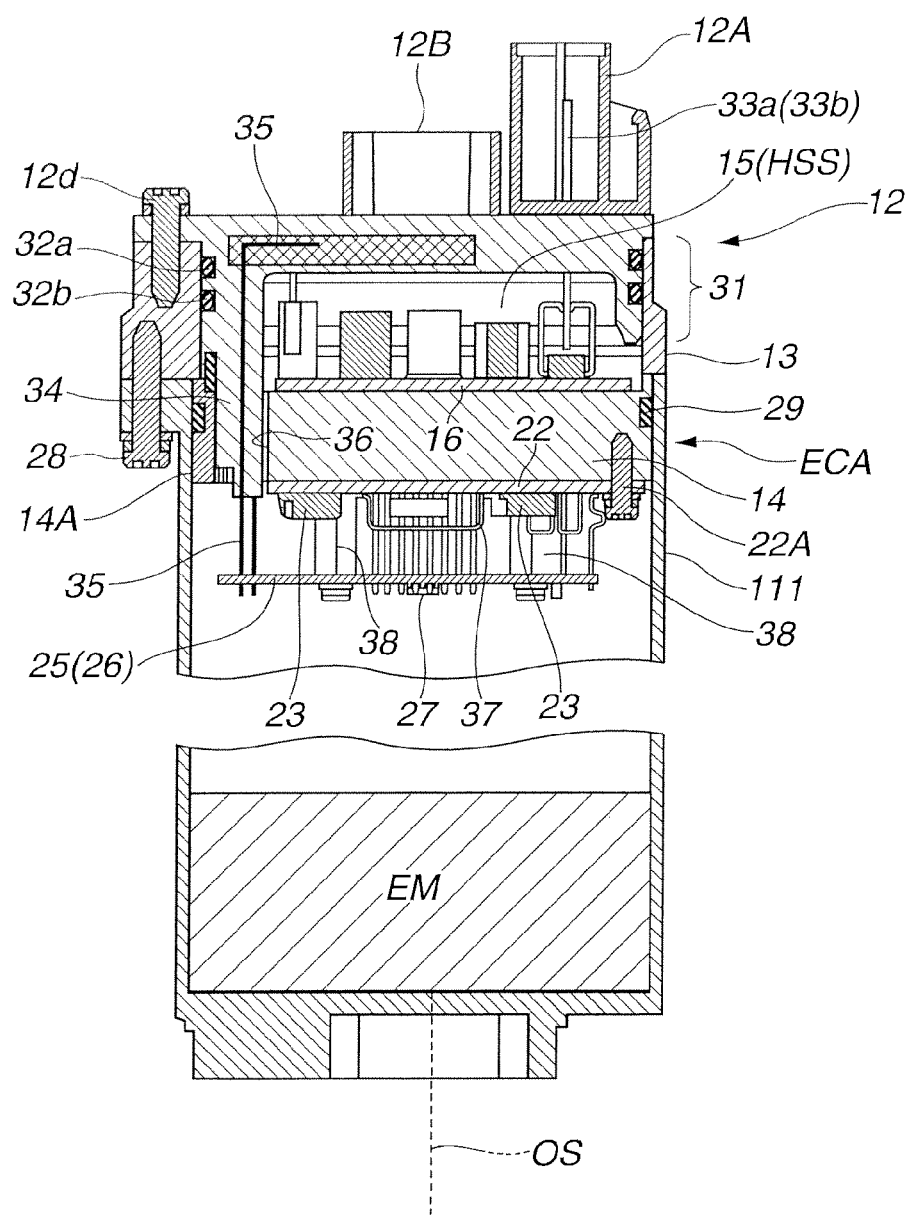
FIG. 4 is an enlarged sectional view of the essential portion of the electric power steering device of the present invention.

That is, as is seen from FIGS. 3 and 4, within an upper part of the cylindrical motor housing 111, there is tightly installed the electronic controller assembly ECA.

As is seen from FIG. 3, the electronic controller assembly ECA comprises a circular partition wall 50 that is tightly set in the cylindrical motor housing 111, an annular intermediate hollow member 13 that is mounted over the circular partition wall 50 and secured thereto by connecting bolts 13a, a lid member 12 that is mounted on the annular intermediate hollow member 13 and secured thereto by connecting bolts 12d and various electronic elements of an electronic control unit (ECU) 9 that are neatly arranged in spaces defined between the wall 50, hollow member 13 and lid member 12 in an after-mentioned manner.

More specifically, the electronic elements of the electronic control unit (ECU)) constitute a power circuit part 15, a power conversion circuit part 21 and a control circuit part 25. As is seen from FIG. 3, within the annular intermediate hollow member 13, there is installed a circular heat transfer substrate 14 that is made of aluminum or aluminum alloy.

The annular intermediate hollow member 13 comprises a cylindrical body made of a synthetic resin that has the heat transfer substrate 14 integrally molded thereto. However, if desired, the cylindrical body and the heat transfer substrate 14 may be integrally molded from an aluminum alloy. As will be described hereinafter, the heat transfer substrate 14 functions to effectively transfer a heat, which is generated by the power circuit part 15 and the power conversion circuit part 21, to the cylindrical motor housing 111. More specifically, the heat transfer substrate 14 functions to effectively transmit the heat of the circuit parts 15 and 21 to the annular intermediate hollow member 13. For this function, a cylindrical outer wall of the circular heat transfer substrate 14 is intimately secured to a cylindrical inner wall of the annular intermediate hollow member 13.

As is seen from FIG. 3, between the lid member 12 and the intermediate hollow member 13, there is arranged the power circuit part 15 that functions to produce a stable electric power.

Figure 6:
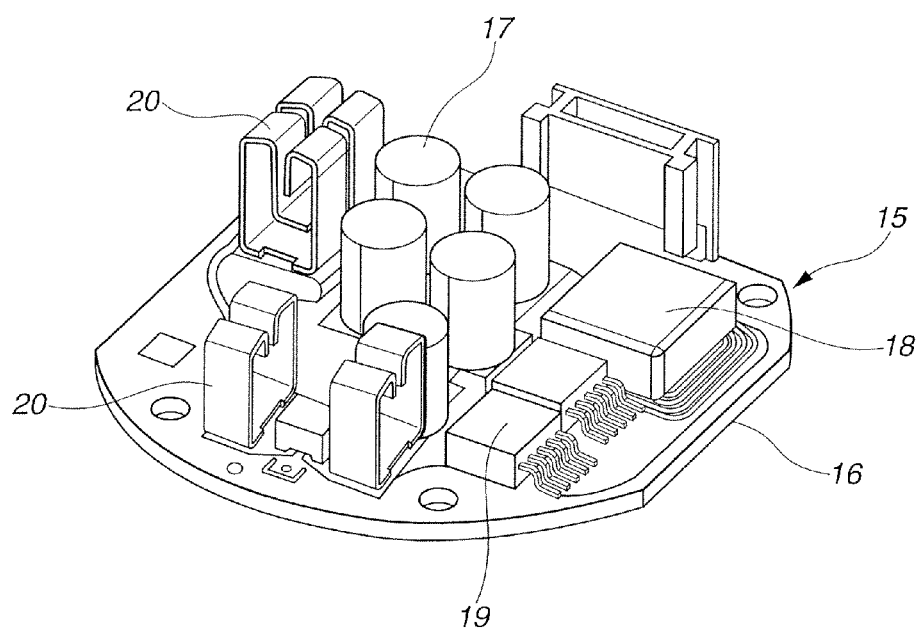
FIG. 6 is a perspective view of a power circuit part employed in the essential portion of the electric power steering device of the present invention.

As is seen from FIG. 6, the power circuit part 15 comprises a basal plate 16, condensers 17, coils 18, switching elements 19 and connectors 20 which are mounted on the basal metal plate 16. The basal plate 16 comprises an aluminum plate, an insulating layer lined on the aluminum plate and a wiring pattern printed on the insulating layer. The condensers 17, coils 18, switching elements 19 and connectors 20 are mounted on and connected to the wiring pattern in a known manner.

As is seen from FIG. 4, the heat transfer substrate 14 and the basal plate 16 are intimately contacted and connected to each other through connecting bolts (not shown) for increasing a heat transmission therebetween. For bonding the heat transfer substrate 14 and the basal plate 16, a high heat conductivity adhesive is used. In place of the adhesive, a gel-like heat transmission material may be used.

As is seen from FIG. 3, the part 15 employs the condensers 17, the coils 18 and the connectors 20 which are bulky in construction. Thus, the power circuit part 15 is installed in a relatively large space defined between the lid member 12 and the annular intermediate hollow member 13. This reason will be described hereinafter.

As is seen from FIG. 3, the power conversion circuit part 21 that mainly controls the operation of the electric motor EM is arranged in a space defined between the annular intermediate hollow member 13 and the motor housing 111.

Figure 7:
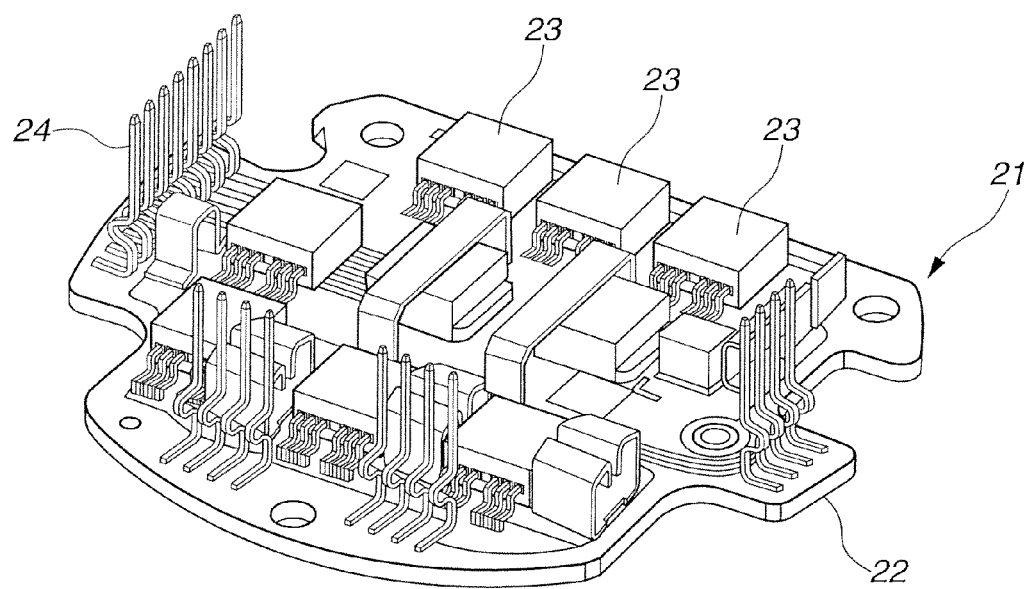
FIG. 7 is a perspective view of a power conversion circuit part turned upside down, which is employed in the essential portion of the electric power steering device of the present invention.

As is seen from FIG. 7 which shows a reversed view of the power conversion circuit part 21 relative to that shown in FIG. 4, part 21 comprises a basal plate 22, a plurality of MOSFETs 23 and input/output connectors 24 which are operatively mounted on the basal plate 22. Like the above-mentioned basal plate 16 of the power circuit part 15, the basal plate 22 comprises an aluminum plate, an insulating layer lined on the aluminum plate and a wiring pattern printed on the insulating layer. The MOSFETs 23 and input/output connectors 24 are mounted on and connected to the wiring pattern in a known manner.

As is seen from FIG. 4, the heat transfer substrate 14 and the basal plate 22 are intimately contacted and connected to each other through connecting bolts (not shown) for increasing a heat transmission therebetween. For bonding the heat transfer substrate 14 and the basal plate 22, a high heat conductivity adhesive is used. In place of the adhesive, a gel-like heat transmission material may be used.

As is seen from FIG. 3, between the power conversion circuit part 21 and the circular partition wall 50 in the motor housing 111, there is arranged a control circuit part 25 that mainly controls switching operation of the MOSFETs 23 of the power conversion circuit part 21.

Figure 8:
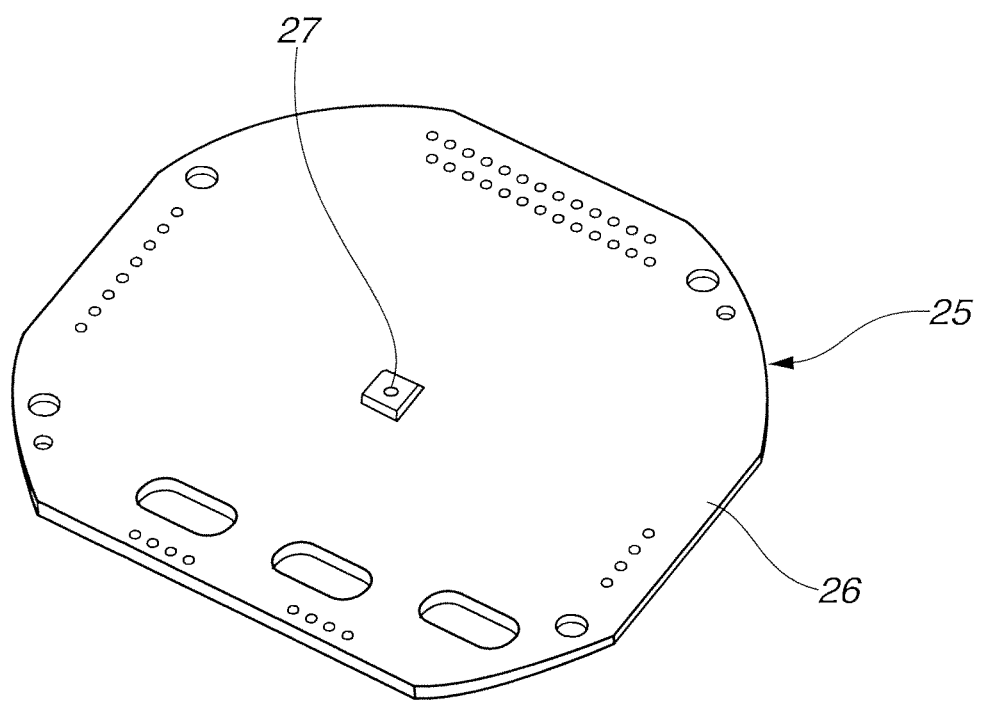
FIG. 8 is a perspective view of a control circuit part turned upside down, which is employed in the essential portion of the electric power steering device of the present invention.

As is seen from FIG. 8 which shows a reversed view of the control circuit part 25 relative to that shown in FIG. 4, the part 25 comprises a resin substrate 26 and a microcomputer 27 that is mounted on the resin substrate 26 for controlling the MOSFETs 23.

As is seen from FIG. 4, the resin substrate 26 of the control circuit part 25 and the basal plate 22 of the power conversion circuit part 21 are spaced from each other by a given distance.

As is best shown in FIG. 3, the lid member 12 has several connectors 12A, 12B and 12C mounted thereon. Through the connectors 12A, 12B and 12C, electric power and various signals are inputted into or outputted from the power circuit part 15, the power conversion circuit part 21 and the control circuit part 25.

Figure 5:
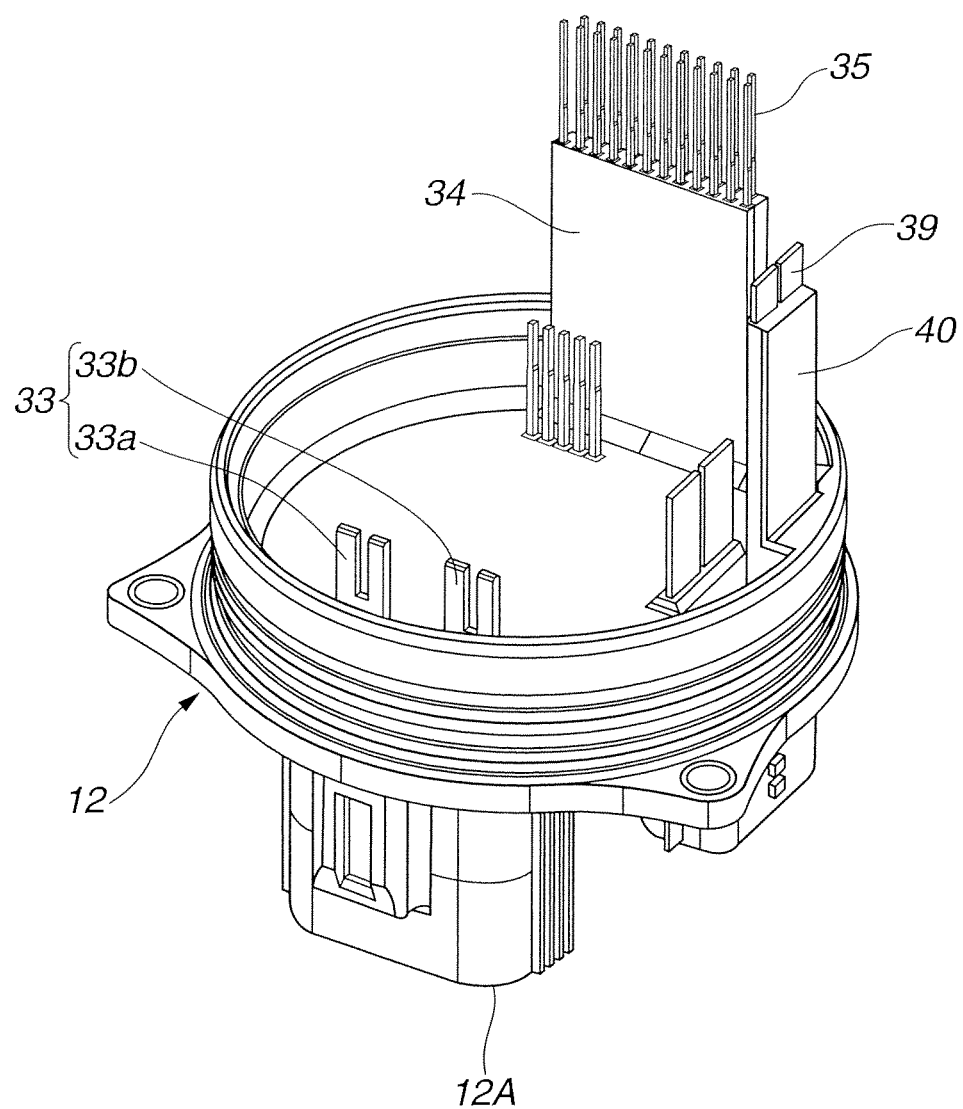
FIG. 5 is an enlarged perspective view of a lid member turned upside down, which is employed in the essential portion of the electric power steering device of the present invention.

The detailed construction of the lid member 12 is shown in FIG. 5 which shows a reversed view of the lid member 12 relative to that shown in FIG. 4.

In the following, the detail of the electronic controller assembly ECA set in the motor housing 111 will be described with the aid of FIGS. 3 and 4.

As is seen from the drawings, the annular intermediate hollow member 13 is secured to the motor housing 111 through connecting bolts 28, and the heat transfer substrate 14 is integrated with the molded resin of the annular intermediate hollow member 13. As has been mentioned hereinabove, the heat transfer substrate 14 and the annular intermediate hollow member 13 may be integrally molded from an alumina alloy or the like.

As is seen from FIG. 4, an outer cylindrical wall of the circular heat transfer substrate 14 is intimately contacted to an inner cylindrical surface of the motor housing 111. With this, the heat in the heat transfer substrate 14 can smoothly and effectively transmit to the motor housing 111. If desired, a high heat conductivity adhesive may be applied to the mutually contacting surfaces of the heat transfer substrate 14 and the motor housing 111. A seal ring 29 is disposed between the circular heat transfer substrate 14 and the cylindrical motor housing 111. In the illustrated embodiment, the seal ring 29 is set in an annular recess (no numeral) formed in the outer cylindrical surface of the heat transfer substrate 14. With the seal ring 29, a water-tight sealing is effected between the heat transfer substrate 14 and the cylindrical motor housing 111.

As is seen from FIGS. 3 and 4, on the upper surface of the heat transfer substrate 14, there is intimately put the basal plate 16 of the power circuit part 15. For securing the basal plate 16 to the heat transfer substrate 14, several connecting bolts are used.

As shown in FIG. 4 and as has been mentioned hereinabove, relatively bulky elements of the power circuit part 15, such as condensers 17, coils 18 and connectors 20, are mounted on the basal plate 16. Thus, the power circuit part 15 is arranged in a hermetically sealed space "HSS" that is defined between the lid member 12 and the annular intermediate hollow member 13.

The sealability of the hermetically sealed space HSS is increased by the following sealing construction.

As shown in FIG. 4, two seal rings 32a and 32b are operatively disposed between an outer cylindrical wall of a cylindrical part of the lid member 12 and an inner cylindrical wall of the annular intermediate hollow member 13. In the illustrated embodiment, the two seal rings 32a and 32b are set in annular grooves (no numerals) formed in the outer cylindrical wall of the cylindrical part of the lid member 12. If much effective sealability of the sealed space HSS is needed, an overlapped part 31 between the cylindrical part of the lid member 12 and the annular intermediate hollow member 13 is enlarged. Designated by numerals 33a and 33b in FIGS. 4 and 5 are male terminals that are arranged to pass through the power input connector part 12A. That is, when the cylindrical part of the lid member 12 is properly put into the intermediate hollow member 13, the mail terminals 33a and 33b are brought into engagement with female terminals 33c and 33d provided by the power circuit part 15.

As is seen from FIG. 5 which shows the lid member 12 turned upside down, a signal connector 34 extends from the bottom side of the lid member 12, which has a plurality of lead cables 35 whose ends are exposed to the outside, as shown. As is seen from FIG. 4, when the lid member 12 is properly mated with the intermediate hollow member 13 in the above-mentioned manner, the signal connector 34 is put into an opening 36 formed in the heat transfer substrate 14 causing the exposed ends of the lead cables 35 to be brought into engagement with given circuits of the control circuit part 25.

As will be understood from FIGS. 3 and 4, in a space defined between the heat transfer substrate 14 and the circular partition wall 50 in the motor housing 111, there are arranged the power conversion circuit part 21 and the control circuit part 25.

As is seen from FIG. 4, the basal plate 22 of the power conversion circuit part 21 is intimately put on the lower surface of the heat transfer substrate 14 and secured to the substrate 14 through connecting bolts 22a. As shown, the MOSDETs 23 and jumper wires 37 are put on the lower surface of the basal plate 22.

In most cases, the power circuit part 15 and power conversion circuit part 21 are constructed to handle or treat a current of which carrying capacity is larger than that of the control circuit part 25. An electric power produced by the power conversion circuit part 21 is directly applied to the electric motor EM through bus bars (not shown).

As is seen from FIG. 4, the heat transfer substrate 14 has both an upper surface to which the basal plate 16 of the power circuit part 15 is flatly and intimately attached and fixed by connecting bolts (not shown) and the above-mentioned lower surface to which the basal plate 22 of the power conversion circuit part 21 is flatly and intimately attached and fixed by the connecting bolts 22a. With such intimate connection, any heat produced in the power circuit part 15 and the power conversion circuit part 21 is transmitted to the heat transfer substrate 14 and then transmitted to the motor housing 111 and then transmitted to the open air. It is now to be noted that both the upper and lower surfaces of the heat transfer substrate 14 are used for effectively receiving the heat from the power circuit part 15 and the power conversion circuit part 21. This arrangement brings about a compact construction of the heat radiation.

As is seen from FIG. 4, in the space defined between the power conversion circuit part 21 and the motor housing 111, there are placed a plurality of support columns 38 of the intermediate hollow member 13. The resin substrate 26 of the control circuit part 25 is supported by the support columns 38. As shown, the microcomputer 27 is mounted on a lower surface of the resin substrate 26 of the control circuit part 25.

As has been mentioned hereinabove, the signal connector 34 of the lid member 12 is put into the opening 36 of the heat transfer substrate 14 avoiding contact with the power circuit part 15 and the power conversion circuit part 21. Accordingly, the lead cables 35 held by the signal connector 34 can be connected to the given circuits of the control circuit part 25 without being interrupted by such parts 15 and 21. This arrangement brings about non-use of cord relay parts or devices and thus reduction in production cost of the electric drive device is achieved.

As is seen from FIG. 5, the lid member 12 is equipped with various connectors which are a power connector 33 that includes the above-mentioned male terminals 33a and 33b, the signal connector 34 that connects the detecting sensors to the control circuit part 25 and a drive connector 39 that connects the power conversion circuit and the power source. The drive connector 39 is tightly held by a flat pillar portion 40.

As will be understood from FIG. 4, both the basal plate 22 of the power conversion circuit part 21 and the basal plate 16 of the power circuit part 15 are placed behind the resin substrate 26 of the control circuit part 25 with respect to the electric motor "EM". Thus, the resin substrate 26 can serve as a heat block plate for blocking the heat from the electric motor "EM" to the two basal plates 22 and 16.

As will be understood from the above description, in accordance with the present invention, the electronic controller assembly "ECA" (see FIG. 4) comprises substantially three axially spaced areas which are the uppermost area where the power circuit part 15 mounted on the basal plate 16 is placed, the middle area where the power conversion circuit part 21 mounted on the basal plate 22 is placed and the lowermost area where the control circuit part 25 mounted on the resin substrate 26 is placed. With this divided arrangement, the number of parts mounted on each plate or substrate 16, 22 or 26 can be reduced and thus, each plate or substrate 16, 22 or 26 can be reduced in radial size.

Due to the above-mentioned divided arrangement, the axial length of the electronic controller assembly "ECA" is inevitably increased. However, due to the nature of the electric power steering device, such increase in the axial length of the assembly "ECA" does not make a remarkable effect on the entire length of the electric power steering device.

Since the basal plate 16 of the power circuit part 15 and the basal plate 22 of the power conversion circuit part 21 are respectively placed on upper and lower surfaces of the heat transfer substrate 14, the heat produced by the circuit parts 15 and 21 can be effectively transferred to the motor housing 111 and thus effectively radiated to the open air. Usage of the upper and lower surfaces of the heat transfer substrate 14 as holding means for the circuit parts 15 and 21 brings about reduction in size of the electronic controller assembly "ECA".

Since the power circuit part 15 including various bulky electric parts is received in a storage space defined by the relatively long overlapped part 31, effective storage of the bulky electric parts in the space is achieved.

As is mentioned hereinabove, in accordance with the present invention, there is provided an electronic control assembly that is divided into three parts in an axial direction, which are a power circuit part that is mounted on a basal metal plate to mainly generate an electric power, a power conversion circuit part that is mounted on a basal metal plate to mainly drive an electric motor and a control circuit part that is mounted on a resin plate to mainly control the power conversion circuit part in which a heat transfer metal substrate is installed in a metal housing of the electronic control assembly while contacting with an inner wall of the metal housing and in which the basal metal plate of the power circuit part and the basal metal plate of the power conversion circuit part are intimately and respectively fitted to opposed flat surfaces of the heat transfer metal substrate. With this arrangement, the heat generated by the power circuit part and the power conversion circuit part is effectively transferred to the metal housing through the heat transfer metal substrate and radiated to the open air from the metal housing.

With the above-mentioned axially arranged three parts of the electronic control assembly, the radial size of each of the power circuit part, power conversion circuit part and control circuit part can be reduced. Furthermore, since the respective basal metal plates of the power circuit part and power conversion circuit part are intimately fitted to opposed surfaces of the heat transfer metal substrate fitted to the inner wall of the metal housing, the heat generated by the power circuit and power conversion circuit parts is effectively transferred to the metal housing through the heat transfer metal substrate and effectively radiated to the open air from the metal housing.

The entire content of Japanese Patent Application 2014-178802 filed Sep. 3, 2014 is incorporated herein by reference.

Although the invention has been described above with reference to embodiments of the invention, the invention is not limited to such embodiments as described above. Various modifications and variations of such embodiments may be carried out by those skilled in the art, in light of the above description.

What is claimed is:

1. An electric drive device for driving a machine system, comprising:
    an electric motor having an output shaft by which control elements of the machine system are driven; and
    an electronic control unit arranged at a position opposite to a position where the output shaft of the electric motor is arranged, the electronic control unit including a cylindrical metal housing with a bottom wall that has the electric motor connected thereto and an electronic control assembly that is installed in the cylindrical metal housing to control the operation of the electric motor,
    wherein the electronic control assembly is divided into three parts that are coaxially installed in the cylindrical metal housing in order, the three parts being a power circuit part that is mounted on a basal metal plate and is configured to generate an electric power, a power conversion circuit part that is mounted on another basal metal plate and is configured to drive the electric motor and a control circuit part that is mounted on a resin plate and is configured to control the power conversion circuit part,
    wherein a heat transfer metal substrate is installed in the cylindrical metal housing while contacting at a cylindrical outer wall thereof with an inner wall of the cylindrical metal housing; and
    wherein the basal metal plate of the power circuit part and the another basal metal plate of the power conversion circuit part are respectively connected to opposed flat surfaces of the heat transfer metal substrate.

2. An electric drive device as claimed in claim 1, in which the heat transfer metal substrate is installed in the cylindrical metal housing through an intermediate hollow member and in which a lid member is connected to the intermediate hollow member in a manner to close one open end of the intermediate hollow member, the lid member being provided with a plurality of connectors.

3. An electric drive device as claimed in claim 2, in which the intermediate hollow member is made of either one of a metal and a synthetic resin.

4. An electric drive device as claimed in claim 2, in which the power circuit part is installed in a space defined between the lid member and the intermediate hollow member, the basal metal plate of the power circuit part is connected to one surface of the heat transfer metal substrate, the power conversion circuit part is installed in a space defined between the cylindrical metal housing and the intermediate hollow member, the another basal metal plate of the power conversion circuit part is connected to the other surface of the heat transfer metal substrate, and the control circuit part is installed in a space defined between the power conversion circuit part and the electric motor.

5. An electric drive device as claimed in claim 2, in which a contact/overlapped area where the intermediate hollow member and the lid member are in contact and overlapped with each other is equipped with two seal rings to provide a hermetically sealed space for housing therein electric elements of the power circuit part.

6. An electric drive device as claimed in claim 4, in which the connectors of the lid member are directly connected to printed wiring patterns on the basal metal plate of the power circuit part and the another basal metal plate of the power conversion circuit part without intervention of cord relay parts.

7. An electric drive device as claimed in claim 6, in which the connectors connected to the power conversion and control circuit parts are embedded in a guide portion that is integrally provided by the lid member, and in which the guide portion extends toward the power conversion and control circuit parts through a guide opening that is formed in the heat transfer metal substrate.

8. An electric power steering device of a motor vehicle, comprising:
    an electric motor having an output shaft through which a steering assist force is applied to a steering shaft of the vehicle;
    an electronic control device for controlling the electric motor, the electronic control device being arranged at a position opposite to a position where the output shaft of the electric motor extends and including a cylindrical metal housing that has a bottom to which the electric motor is connected and an electronic control assembly that is installed in the cylindrical metal housing to control the operation of the electric motor,
    wherein the electronic control assembly is divided into three parts that are coaxially installed in the cylindrical metal housing in order, the three parts being a power circuit part that is mounted on a basal metal plate and is configured to generate an electric power, a power conversion circuit part that is mounted on another basal metal plate and is configured to drive the electric motor and a control circuit part that is mounted on a resin plate and is configured to control the power conversion circuit part,
    wherein a heat transfer metal substrate is installed in the cylindrical metal housing while contacting at a cylindrical outer wall thereof with an inner wall of the cylindrical metal housing; and
    wherein the basal metal plate of the power circuit part and the another basal metal plate of the power conversion circuit part are respectively connected to opposed flat surfaces of the heat transfer metal substrate.

9. An electric power steering device as claimed in claim 8, in which the heat transfer metal substrate is installed in the cylindrical metal housing through an intermediate hollow member and in which a lid member is connected to the intermediate hollow member in a manner to close one open end of the intermediate hollow member, the lid member being provided with a plurality of connectors.

10. An electric power steering device as claimed in claim 9, in which the intermediate hollow member is made of either one of a metal and a synthetic resin.

11. An electric power steering device as claimed in claim 9, in which the power circuit part is installed in a space defined between the lid member and the intermediate hollow member, the basal metal plate of the power circuit part is connected to one surface of the heat transfer metal substrate, the power conversion circuit part is installed in a space defined between the cylindrical metal housing and the intermediate hollow member, the another basal metal plate of the power conversion circuit part is connected to the other surface of the heat transfer metal substrate, and the control circuit part is installed in a space defined between the power conversion circuit part and the electric motor.

12. An electric power steering device as claimed in claim 9, in which a contact/overlapped area where the intermediate hollow member and the lid member are in contact and overlapped with each other is equipped with two seal rings to provide a hermetically sealed space for housing therein electric elements of the power circuit part.

13. An electric power steering device as claimed in claim 11, in which the connectors of the lid member are directly connected to printed wiring patterns on the basal metal plate of the power circuit part and the another basal metal plate of the power conversion circuit part without intervention of cord relay parts.

14. An electric power steering device as claimed in claim 13, in which the connectors connected to the power conversion and control circuit parts are embedded in a guide portion that is integrally provided by the lid member, and in which the guide portion extends toward the power conversion and control circuit parts through a guide opening that is formed in the heat transfer metal substrate.

15. An electric power steering device of a motor vehicle, comprising:
   a cylindrical metal housing having therein first, second, third and fourth spaces that are coaxially arranged in order;
   an electric motor mounted in the fourth space and having an output shaft through which a steering assist force is applied to a steering shaft of the motor vehicle;
   a power circuit part arranged in the first space and including a first basal metal plate and electric elements mounted on the first basal metal plate;
   a power conversion circuit part arranged in the second space and including a second basal metal plate and electric elements mounted on the second basal metal plate;
   a control circuit part arranged in the third space and including electric elements;
   a circular heat transfer metal substrate arranged in the cylindrical metal housing between the first and second spaces, the circular heat transfer metal substrate having a cylindrical outer wall that is in contact with an inner cylindrical surface of the cylindrical metal housing, an upper flat surface to which the first basal metal plate is intimately connected and a lower flat surface to which the second basal metal plate is intimately connected; and
   a lid member connected to an open end of the cylindrical metal housing.

* * * * *